Oct. 5, 1937.   J. A. FLINT   2,094,787
METHOD AND APPARATUS FOR TRANSFERRING MATERIAL
Filed Jan. 7, 1936   2 Sheets-Sheet 1
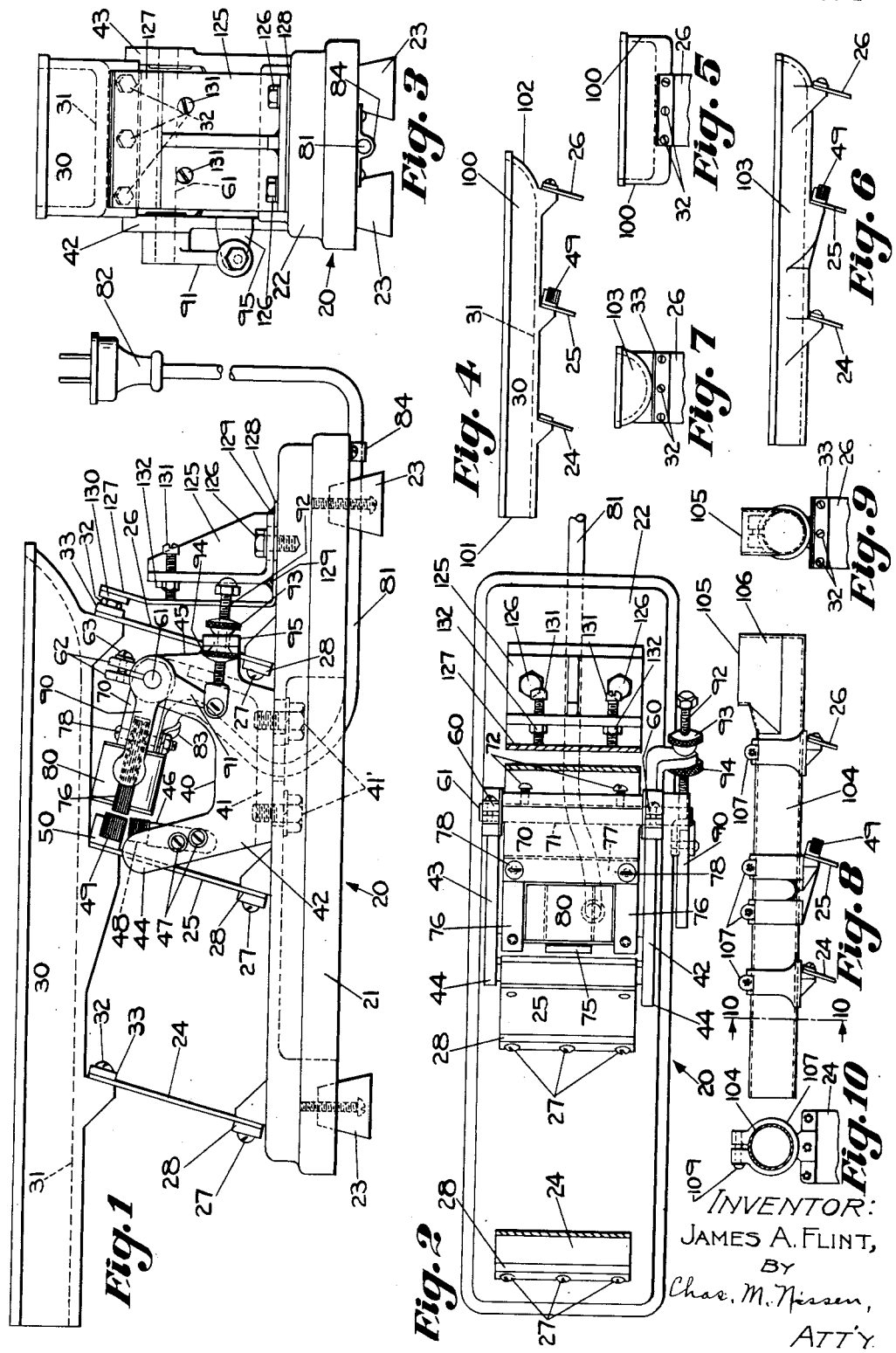
INVENTOR:
JAMES A. FLINT,
BY
Chas. M. Nissen,
ATT'Y Oct. 5, 1937.   J. A. FLINT   2,094,787
METHOD AND APPARATUS FOR TRANSFERRING MATERIAL
Filed Jan. 7, 1936   2 Sheets-Sheet 2

INVENTOR:
JAMES A. FLINT,
BY
Chas. M. Nissen,
ATT'Y.

Patented Oct. 5, 1937

2,094,787

UNITED STATES PATENT OFFICE 2,094,787

METHOD AND APPARATUS FOR TRANSFERRING MATERIAL

James A. Flint, Columbus, Ohio, assignor to The Traylor Vibrator Company, a corporation of Colorado Application January 7, 1936, Serial No. 57,910

14 Claims. (Cl. 198—220)

The present invention relates to a method of conveying material and to means for effecting said method comprising a conveyor of the vibratory type. It relates particularly to a method of and means for conveying granular material such as ore, coal, coke, chemicals, sand, gravel, stone, cinders and numerous other materials of this general type.

One of the objects of the present invention is to provide a new method of conveying material in a conveyor of the above mentioned general type and means for carrying out said method, in which the conveying surface is mounted upon energy storing cantilevers in which energy may be periodically stored and then transferred to the material to be conveyed.

Another object of the invention is to provide a vibratory conveyor which may be operated directly from a source of commercial current and when so operated will vibrate at a high frequency, which may be from 3000 to 7200 cycles per minute, depending on the frequency of said current.

Another object of the invention relates to a method of conveying material by vibratory action at a high frequency.

Another object of the invention relates to a method of conveying material, and means for carrying out said method, in which a vibratory conveying deck is vibrated at a frequency near to, but not exactly equal to, its natural period, and preferably, but not necessarily, at a high frequency, as from 3000 to 7200 cycles per minute.

Other objects of the invention will appear hereinafter, the novel features and combinations being set forth in the appended claims.

In the drawings:

Fig. 1 is a side elevation of the device of my invention;

Fig. 2 is a plan view thereof with the conveyor trough removed;

Fig. 3 is a rear end view of my device;

Fig. 4 is a side elevation of one form of trough or pan;

Fig. 5 is an end view of the trough of Fig. 4;

Fig. 6 is a side elevation of another form of trough;

Fig. 7 is an end view of the trough of Fig. 6;

Fig. 8 is a side elevation of still another trough in the form of a cylinder;

Fig. 9 is an end view of the cylindrical trough of Fig. 8;

Fig. 10 is a section on line 10—10 of Fig. 8 looking in the direction of the arrows;

Figure 11:
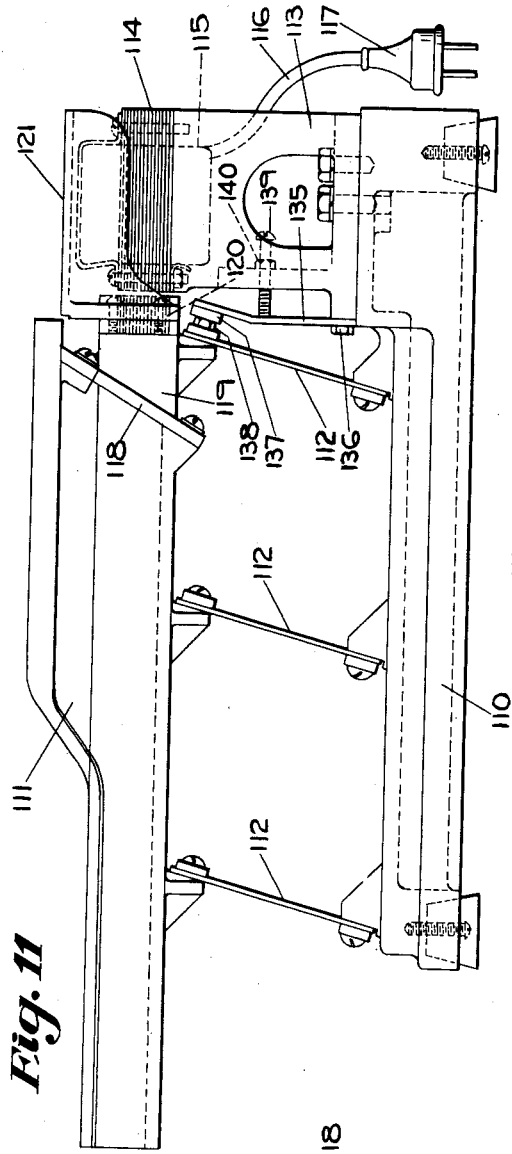
Fig. 11 is a side elevation of a modified form of the device of my invention.

This application constitutes a continuation in part of my application for a Method and apparatus for transferring material, Serial No. 727,770 filed May 26, 1934.

Referring to Figs. 1–3 of the drawings, there is seen at 20 a base for my conveyor preferably comprising a rather heavy metal member, for example an iron or steel casting. Said base 20 may be provided with a hollowed portion 21 to reduce its central weight and is preferably formed solid at its rear end 22 to provide maximum weight at this point, for a purpose hereinafter set forth. Said base 20 is provided with feet 23 of any desired material, for example soft rubber, secured to the base by any desired means, as screws. If desired the feet 23 may be eliminated and the base 20 provided with brackets for attaching it rigidly to any frame or sub-base.

Carried upon the base 20 are a plurality of cantilevers 24, 25 and 26. Three such cantilevers are employed in the device illustrated but any number may be employed so long as the hereinafter discussed relation is maintained. The cantilevers 24, 25 and 26 preferably comprise metallic plates, such as steel plates, rigidly attached at one end to the base plate 20, as by screws 27 and clamping bars 28.

Carried by the cantilevers 24, 25 and 26 adjacent their upper ends is a material supporting member comprising a trough or pan 30. This trough or pan 30 may have any desired sectional shape, and in any case is preferably provided with a relatively smooth supporting surface 31. Said pan or trough is rigidly attached to the upper ends of cantilevers 24, 25 and 26 by any desired means, such as screws 32 and clamping bars 33. It is obvious that the cantilevers 24, 25 and 26 provide a support for the trough or pan 30. In addition, said cantilevers are adapted to store energy under the influence of some deflecting means and to transfer said energy to the pan or trough 30, to impart movement thereto, which movement will cause the movement of any material carried by said pan or trough 30, by imparting an impact thereto.

It is to be particularly noted that the cantilevers 24, 25 and 26 do not form a right angle with the supporting surface 31, but each is located in a transverse plane at an angle less than ninety degrees relative to a horizontal plane. This angle may be varied within wide limits but is preferably greater than 45 degrees and less than 80 degrees. It has been found in practice that an angle of 75 degrees is very satisfactory.

Before going further with the mechanical description of the device, it is believed in the interest of a clear understanding of my new method of operation, to consider at this time the method of operation whereby material is conveyed by said device.

Applicant has a particular theory as to why the conveying action takes place but it is to be understood that he is not restricting his method or apparatus to any theory. Regardless of any theory, correct or not, it is known by applicant that when certain definite steps are performed, or applicant's particular apparatus is operated, a conveying action is obtained.

The cantilevers 24, 25 and 26 not only provide a support for the trough or pan 30 but also comprise energy storing means which energy is employed to impart movement to said trough or pan 30. By deflecting the cantilevers 24, 25 and 26 to the right, as viewed in Fig. 1, energy is stored therein. This deflecting action may be supplied by any desired motor, preferably an electric motor. However, the motor employed should have the characteristic of releasing the cantilevers after they are deflected whereby the energy stored therein by their deflection may be utilized to impart movement to the trough or pan 30. It is believed to be essential that this movement shall have a directional component parallel to the plane of the supporting surface 31 and a directional component vertical therewith. It is preferable that the parallel component be the greater of the two. To obtain these particular components, cantilevers 24, 25 and 26 are set at an angle to the plane of the supporting surface 31, as above set forth. It is applicant's belief that when the supporting surface 31 receives movement, as above indicated, it imparts a force or impact to each particle of material resting on or touching said surface. This force has two components, one parallel to the supporting surface and one perpendicular therewith. The perpendicular component tends to lift the particle off the supporting surface and the parallel component tends to impel it to a position horizontally removed from its first position. The expression "horizontally removed" does not require that said movement be restricted to a horizontal plane but means that the movement has a horizontal component. It may also have a vertical component, for applicant's device is operative to move material up a grade. That is, the plane of the surface 31 may be inclined to the horizontal and material may be moved up the incline. This feature is of particular importance when applicant's method is used in a device for screening material, for which purpose it may well be used, and it is desired to have the bed of material to be screened conveyed up an inclined screening surface.

It is preferred that the supporting surface 31 have a periodic vibratory movement, whereby a series of small movements in very rapid succession are imparted to the material. This, of course, requires the cantilevers 24, 25 and 26 to be periodically deflected and released, during each deflection of which energy is stored therein, and during each releasing of which said energy is transferred to the supporting surface 31 and ultimately imparted to the material to be conveyed. Under these conditions, it is applicant's belief that the particles of conveyed material pass along the trough in a series of hops, actually touching the surface 31 only at intervals. In actual practice evidence to support this belief is found in the fact that highly abrasive materials have been conveyed with little wear on the supporting surface 31 even after extended use. Where the material comprises particles forming a bed of relatively small particles, the particles at the top of the bed may never touch the supporting surface 31, but they will be impelled by being struck by the particles of the lower part of the bed, and therefore thick beds of material may be conveyed as well as thin beds.

It is conducive to increased efficiency of operation, to make the rate of oscillations of the supporting surface 31 very high. Operation at a very high frequency has two important advantages. In the first place it makes for a device in which the natural period of vibration of the deck or pan 30 is substantially independent of the load thereon. That is, the natural period of said deck of pan 30 is substantially the same when empty as when fully loaded. This is believed to be due to the fact that at the high frequencies the load is almost completely a "live" load and does not attach to the deck or pan 30 and thus does not act as a "dead" load. The second important advantage is that applicant is able to operate his device directly from the standard commercial alternating currents without requiring any extraneous apparatus, such as motor generator sets, or rectifiers, and without a make-and-break type of vibrator. That is, the device may operate directly from commercial currents of 25, 30, 50 or 60 cycles and vibrate at frequencies of 3000, 3600, 6000 or 7200 cycles per minute, respectively. The operation at 6000 and 7200 cycles per minute is preferred, particularly with the units of small size.

In order to enhance greatly the efficiency of applicant's method and apparatus and to reduce greatly the energy necessary to effect said method it is extremely desirable that the vibratory system, which may be considered as comprising the pan 30 and all elements rigid therewith, including approximately one-third of the cantilevers 24, 25 and 26, comprise an oscillatory system the natural period of vibration of which is approximately equal to the period at which said body is vibrated by the operating motor. However, it is preferable that the period of vibration of said body be not exactly in resonance with the frequency of operation of said motor for such a condition tends to render the device unstable. As is well known, when a body is vibrating at its natural period, the only energy necessary to maintain said vibration is that required to supply the losses. Furthermore, said oscillations are easily damped out if the supplied energy is reduced to prevent self destruction, by placing a light load on the device. To provide proper control and yet receive a considerable advantage inherent in operating the vibratory system at its natural period I prefer to operate said system at a period slightly different from its natural period. In this manner the system is always loaded to some degree, thereby preventing self destruction and providing proper control. This may be done by operating said system at a period either slightly lower or slightly higher than said natural period. In practice, natural periods from one-fourth (¼) cycle to six (6) cycles above or below the frequency of the energizing source have been used for 60 cycle operation, but the range may be slightly increased to approximately fifteen percent. (15%) of the frequency of the energizing source as an outside limit, and the range from one-fourth (¼) cycle to approximately fifteen percent. (15%) of the frequency of the energizing source is intended in any claim which requires operation at a period which differs slightly from the natural period thereof. In small size units, the lower part of the range has been used and in a typical illustration it will be from one-fourth (¼) to four (4) cycles off of resonance for a 60 cycle unit. In the larger units, the higher part of the range is employed and in a typical illustration it will be from one and one-half (1½) to six (6) cycles off of resonance where the machine is energized at 60 cycles. Generally, the larger machines will be operated farther from resonance. These settings may be either above or below the resonant frequency, as was previously mentioned. As an illustration, a unit designed to be operated from a source of current of 60 cycles, and at 7200 cycles per minute, will be designed so that the vibratory structure including the deck or pan 30 will have a natural period of vibration from 60½ to 64 cycles per second or from 56 to 59½ cycles per second. Sittings of 61½ and 58½ cycles per second are very commonly used with the small units.

In practice it has been found desirable to construct the device for operation at a frequency slightly higher than its natural period. If a person in using the device should find that its maximum delivery was less than desired it might then be increased by slightly decreasing the period of said system. This decrease in period may be accomplished by slightly releasing the rigidity of one of the cantilevers 24, for example by loosening one or more of the screws 27 to a slight extent. If for reasons of safety, it is desired to prevent the system from being tuned to its exact natural period, after being once constructed, said system may be constructed with a natural period slightly below the period at which it is to be operated.

It is to be noted that when the cantilevers 24, 25 and 26 are deflected to store energy and thereafter give up or dissipate said energy, not only do they exert a force on the pan or trough 30 but they also exert a force on the base 20. It is, of course, desirable that said stored energy be employed to a maximum degree in imparting motion to the pan or trough 30 rather than to said base 20. This is effected by the fact that the pan or trough, and such elements as are rigid therewith, have the above mentioned natural period close to that of the period of vibration imparted thereto, while the base 20, and the parts rigid therewith, are not resonant at this period. In addition, the base 20 is made considerably heavier than the pan or trough 30. In theory, it might well be of infinite weight. In practice, it has been found desirable to make it at least twice as heavy as the pan or trough 30.

Furthermore, to derive the maximum benefit from the forces created by cantilevers 24, 25 and 26 when they give up their stored energy it is preferred that the resultant of all of the forces of these cantilevers pass through the center of percussion of the vibratory system; that is, the pan 30 and its rigid elements. As is well known, a force applied at the center of percussion of a mass will impart the maximum acceleration thereto. In addition, the most efficient distribution of the energy given up by cantilevers 24, 25 and 26, as between the vibrating system and the relatively stationary system including the base 20, would be effected if the resultant force, above mentioned, not only passed through the center of percussion of the former but also passed through the center of gravity of the latter. To accomplish this result it would be necessary to extend greatly the base 20 rearwardly, and in some cases this is possible. In general, however, satisfactory operation is accomplished by concentrating the weight of the base near the rear end thereof as much as possible. This is done by removing base material near its center and making the rear end 22 solid.

Purely by way of illustration, and not by way of restriction, applicant submits herewith an example of one method of designing a typical conveyor which has been found operative and also submits some of the constructional details thereof.

Assuming it is desired to construct a conveyor with a trough or pan (deck), having a flat burden supporting surface to transport 2000 pounds of silica sand per hour over a distance of 15 inches.

The size of the trough or pan (deck) is first determined, such as the width and depth. For example the desired width may be 3 inches. The depth will then be computed as follows:

$$d_m = \frac{A_m}{W_c} \qquad (1)$$

$W_m = 2000$ lbs. per hour.
$V_m = 2000$ specific weight expressed as lbs. per cu. ft.

In this case, silica sand having a specific weight of 100.

$$V_m = \frac{2000}{100} = 20 \text{ cu. ft. per hr.}$$

Assume a conveying speed ($C_m$) of 1200 feet per hour, which is a practical speed as determined by experiment $$A_m = \frac{V_m}{C_m} = \frac{20}{1200} = \frac{1}{60} \text{ sq. ft.}$$

$$\frac{1}{60} \text{ sq. ft.} = 2.4 \text{ sq. in.}$$

$$d_m = \frac{2.4}{3} = .8 \text{ inch.}$$

Where $d_m$ = depth of burden in inches.
$W_c$ = width of deck in inches.
$A_m$ = cross sectional area of burden expressed in sq. inches.
$W_m$ = weight of burden delivered in pounds per hour.
$V_m$ = volume of burden delivered in cu. ft. per hour.
$C_m$ = conveying speed in feet per hour.

The deck will then be made 1¼" deep to take care of a little overload and to provide for materials of lighter weight.

The deck is then designed, as to general shape, etc., within the above noted limitations and the material thereof selected. This material may be almost any suitable metal such as steel, aluminum, brass, wood, glass, etc.

The weight of the deck is then approximately determined by the dimensions and the material used, within reasonable accuracy.

From the length of the deck the spacing of the cantilever bars to be employed are determined, to provide uniform movement of each portion of the deck during vibration thereof. In the size deck above mentioned, made of aluminum, the spacing of the cantilever bars should be approximately five inches. Therefore, it is determined that three sets of cantilever bars are to be employed. A set may be one cantilever bar or, if necessary to provide rigidity, it may comprise more than one bar. In the illustrated case, only one bar is necessary for a set.

The weight of the vibratory system comprising the deck, the vibrating armature, and of each of the vibrator bar clamps is finally determined with accuracy by the cantilever bars.

To select the particular cantilever bars to be used, resort is made to the general formula for computing the load capacity of any single cantilever bar when so functioning. This formula is:

$$W_c = K_w(W_g - W_b) \quad (2)$$

in which $W_c$ = the effective load capacity, in lbs.
$W_g$ = the gross load capacity, in lbs.
$W_b$ = the effective vibrating weight of bar, in lbs.
$K_w$ = the load factor, an empirical factor determined by experimental methods.

The basic formula by which $W_g$ is determined is:

$$W_g = \frac{aEbh^3}{n^2L^3} \quad (3)$$

for a bar of uniform rectangular cross-section in which $a$ = a numerical constant, different for each type bar. For the cantilever type it is a constant for any cross-section or for any material.
$E$ = the modulus of elasticity of the material of the bar, in lbs.
$b$ = the width of the bar, in inches.
$h$ = the thickness of the bar, in inches.
$L$ = the vibrating length of the bar, in inches.
$n$ = the operating frequency of vibration, in cycles per second.

For the device under consideration
$a = 9.81$.
$E = 30,000,000\#$ (for steel).
$b = 3''$.
$h = .065''$.
$L = 2\frac{3}{4}''$ (selected for trial).
$n = 120$ cycles per sec.

Then $$W_g = \frac{9.81 \times 30,000,000 \times 3 \times .065^3}{(120)^2 \times (2\frac{3}{4})^3}$$

$= .82$ lb.

$W_b$ is determined from the general formula $$W_b = \frac{d_b bhL}{2} \quad (4)$$

in which $d_b$ = specific weight of the material of the bar in lbs. per cu. in.
$b$ = the width of the bar, in inches.
$h$ = the thickness of the bar, in inches.
$L$ = the vibrating length of the bar, in inches.
$2$ = a numerical constant.

Then

The values of $b$, $h$ and $L$ are as given above.

$d_b = .288$ for steel.

$$W_b = \frac{.288 \times 3'' \times .065'' \times 2\frac{3}{4}''}{2}$$

$= .08$ lb. (approx.)

Substituting the values of $W_g$ and $W_b$ in Formula (2)

$W_c = K_w (.82 - .08)$
$= .91 \times .74$
$= .67$ $K_w = .91$ as determined by experiment for this type of deck and conveyor.

Therefore each cantilever bar will vibrate a weight of .67 lbs. at the rated frequency of 120 cycles per sec.

As three bars are here employed the weight of the vibrating system will then be $3 \times .67$ lbs. $= 2.01$ lbs. If the pan or deck is heavier, then a greater number of bars of this type may be employed or the same number of bars of greater capacity may be used.

The motor is then selected with suitable power to vibrate the weight of the vibratory system.

The base plate is then made with a weight of at least twice that of the vibratory system. In this case it would be at least 4 pounds in weight, and preferably 6 pounds.

Other methods of design may be employed, the fundamental requirement being that the formula $W_c = K_w (W_g - W_b)$ be satisfied for each condition. This, of course, may include almost an infinite number of conditions for practically each of the terms, including $E$, $b$, $h$, $n$ and $L$ and the number of cantilever bars, is a variable. Returning to a consideration of the device illustrated in the drawings, and particularly to the motor means for periodically storing energy in the cantilevers 24, 25 and 26 and then releasing said cantilevers, I have shown an improved motor of the electrical type. It is to be understood, however, that any well known type of electrical or mechanical motor may be employed which will periodically deflect the cantilevers 24, 25 and 26 and then effectively release them whereby they may transfer their stored energy to the vibratory system.

In the motor illustrated, which is of a new and improved type and embodies a new and improved method of operation, I provide a cradle 40, comprising a base 41 and integral similar U-shaped end brackets 42, 43. The base 41 is rigidly attached to base 20, as by screws 41'. Said end brackets 42 and 43 are each provided with a forward arm 44 and a rearward arm 45. Carried between the forward arms 44 is an inverted U-shaped bracket 46, the opposed legs of which are carried on the opposed forward arms 44, by any desired means, such as screws 47. On the base of said bracket is carried a stationary armature 48, preferably comprising laminations riveted to said bracket base. Directly above the stationary armature 48, but out of contact therewith, is a vibratory armature 49 carried on an angle member 50 in any desired manner, as by rivets; the armature 49 and member 50 being rigidly attached to the pan or trough 30. As illustrated in the drawings, the member 50 may comprise one anchor bar for retaining one of the cantilevers rigid with the pan or trough 30. To this end screws, not shown, may pass through the armature 49, members 50, and cantilever 25 and be threaded into a boss on the pan or trough 30. The armature 49 also preferably comprises a series of laminations.

The rear arms 45 of cradle 40 are each provided with an opening 60 adapted to receive rotatably a shaft 61.

Said openings 60 may form a split bearing by providing said arms 45 with extending fingers 62 to receive an adjusting screw 63. Said screw 63 passes freely from the rearward arm 62 and threads into the forward arm 62 thus providing means for effectively varying the size of openings 68 and the friction on shaft 61. This friction is preferably maintained such that shaft 61 may be rotated but when set in one position will remain therein.

Intermediate the arms 45 is provided a supporting plate 70 provided with a lateral bore 71 at one end adapted to receive the shaft 61. Said plate 70 is maintained rigid with said shaft 61, for rotation thereby, by the set screws 72 which thread through the rear face of said plate 70 and impinge the shaft 61. The forward end of plate 70 is provided with a lateral channel to receive and support a W-shaped field core, preferably of laminated construction. Said field core comprises the central core member 75, the side core members 76 and the base core members 77. Said W-shaped field core is held rigid to said plate 70 by bolts 78 passing through the base 77 thereof and through the forward end of said plate opposite said channel.

Surrounding the central core 75 is a coil 80 of insulated wire providing the field winding for said field core. A cable 81 including a pair of insulated conductors leads from said field coil to any desired terminal, such as a plug terminal 82 adapted to be inserted in a common type of outlet receptacle. Said cable may be held to plate 70 by means of a clip 83 and to base 21 by a bracket 84. Suitable openings are provided in cradle 40 and base 20 to allow passing of said cable therethrough.

Adjacent one end of the shaft 61 there is provided a handle 90, shown of reduced length in the drawings in the interest of clearness, held rigid to said shaft 61 for rotation therewith. Said handle forms a bell crank lever with an arm 91, the end of which is connected by a clevis to an adjustable throw control mechanism. This mechanism comprises threaded shaft 92 provided with adjustable thumb nuts 93, 94. Said shaft 92 extends loosely through an opening in a lateral extension 95, integral with cradle 40.

It will be evident from the drawings that the field core comprising center core 75 and side cores 76 may be positioned opposite the armature 49 or opposite the armature 48 or in any intermediate position between these two extreme positions. For example, said field core may be bridged half by the vibratory armature 49 and half by the vibratory armature 48. The extreme positions of adjustment possible are variably controllable by the thumb nuts 93, 94. By operating handle 90 the field core is rotated on shaft 61 and may assume any desired position relative to said armatures 48 and 49 and when placed in a desired position is there retained by friction. To insure retention in a fixed position, if desired, thumb screws 93, 94 may be screwed home against the sides of arm 95, as illustrated in the drawings.

By providing the adjustable field core and the two armatures 48 and 49 I provide a very effective means for controlling the amplitude of vibration of the vibratory assembly without requiring variations in the current of the field coil, which will maintain said field current substantially constant. If the reluctance of the magnetic path of the alternating current electromagnet is increased, as by increasing the air gap, the current in the exciting winding will increase to maintain the flux substantially constant.

With the field core opposite the vibratory armature 49 substantially all of the flux passes through said armature 49. This flux is alternating in intensity in step with the current alternations in the field coil. However, the attracting force of said flux has twice the frequency of the field current.

The vibrating armature 49 is located closely adjacent to the stationary armature 48 as shown in Fig. 1 and both armatures extend transversely of the supporting structure in front of the forward ends of the poles 75, 76, 76. The air gap between the poles and the armature is therefore approximately uniform irrespective of the position of the electro-magnet. Consequently the choking effect on the current flow is approximately the same whether the poles 75, 76, 76, are facing the armature 49 or facing the armature 48 or are in an intermediate position. The fixed armature 48 is therefore particularly useful in acting as a safety feature in preventing excessive currents in the field coil when the outer ends of the poles are in relatively low positions. Regulation of the amplitude vibration of the deck or trough may therefore be obtained while maintaining the current flow through the electromagnet substantially constant. For example, if the field is excited by alternating current of 60 cycles per second, the armature 49 will vibrate at a rate of 120 cycles per second or 7200 cycles per minute, because each half cycle of alternation is effective to attract said armature. This attraction of the armature 49, of course, results in the deflection of the cantilevers 24, 25 and 26, storing energy in each of them. When the flux is cyclically reduced due to the cyclic reduction in current the deflecting force is gradually reduced to zero. This reduction in force effectively releases the deflected cantilevers 24, 25 and 26 which restore and transfer their stored energy to the vibrating assembly including pan or trough 30. It is obvious that any source of undulating or pulsating flux may be employed to vibrate the vibrating assembly, of which pulsating direct current as obtained from rectifiers, or any equivalent device, is an example. The principal consideration is to maintain the frequency of the vibrations imparted to the vibrating body substantially equal, but preferably not exactly equal, to the natural period of said body. Within this limitation, the frequency of the motor and the natural period of the vibratory body may vary as desired. However, as above set forth, a relatively high frequency is preferred.

To reduce the amplitude of vibration of the vibratory assembly, and consequently reduce the rate of delivery of the material, the field structure is rotated counter-clockwise from the position illustrated in Fig. 1, which is the position for maximum amplitude of vibration. This movement results in a gradual division of the total flux in the field core, which total flux is substantially constant, as aforesaid, the stationary armature 48 gradually carrying more of said flux and thus the vibratory armature 49 carrying less thereof. With the field core substantially opposite the stationary armature 48 no substantial vibrations will be imparted to the vibratory system. Any desired amplitude of vibration between the two extremes is thus possible by establishing a fixed relation between the field core and the two armatures 48 and 49.

As viewed in Fig. 1 the right-hand end is the feed end and the material is discharged from the left-hand end. It has been found in practice that uniform delivery may be relied on although the feed may be variable. It has also been found in practice that the power-consumption of the electro-magnet relative to the work done by the conveyor is relatively low which is believed to be due to the vibratory cantilever action embodying my improved method above described and to the fact that regulation of the amplitude of vibration to vary the rate of feed, may be had according to the load while keeping the current flow substantially constant.

It is to be understood that the material to be transferred may vary widely as to size and size range. For example, the material may be very finely divided material, in powdered form, or may be very large, such as large rocks, slabs of concrete, pieces of metal, etc. Furthermore, any particular load may comprise large and small particles of a relatively wide size range. Still further, any particular load may comprise a combination of materials, such as sand and stone, both of either uniform or widely varying sizes. The device, therefore, has a very wide range of application, being useful to transfer practically any kind of solid material that may be reduced to a size which the trough or pan can carry.

In Figs. 4 and 5 I have illustrated a preferred type of trough or pan construction. This trough has a body 30 with a supporting surface 31. Side walls 100 are provided which with the supporting surface 31 provide a trough of substantially U-shaped cross-section. The trough has an open discharge end 101 and a closed rear or feed end 102.

Figs. 6 and 7 show another type of trough or pan which may be employed. This trough comprises a substantially semi-cylindrical body 103, being otherwise substantially the same as the trough illustrated in Figs. 4 and 5.

Figs. 8, 9 and 10 illustrate still another type of trough or pan which comprises essentially a cylindrical body 104. At the feed end thereof an opening 105 is provided leading to a reception hopper or bin 106. This construction also differs from that of Figs. 4 and 5 or Figs. 6 and 7 in that the cantilevers are not bolted directly to the trough or pan but are bolted to straps 107 which in turn are rigidly clamped to the trough or pan 104, as by screws.

Figure 12:
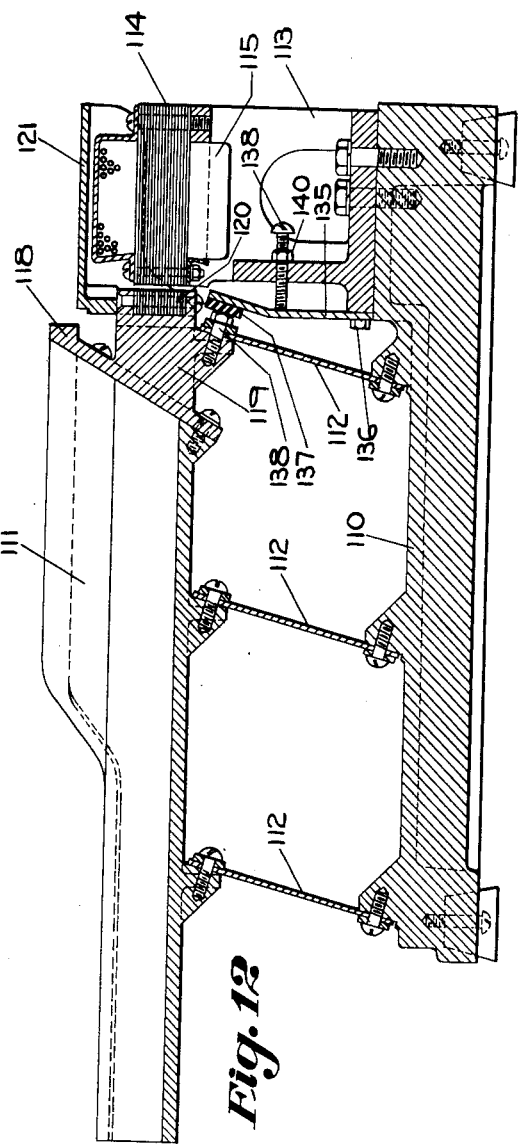
Fig. 12 is a longitudinal elevational sectional view of the device of Fig. 11.
Figure 13:
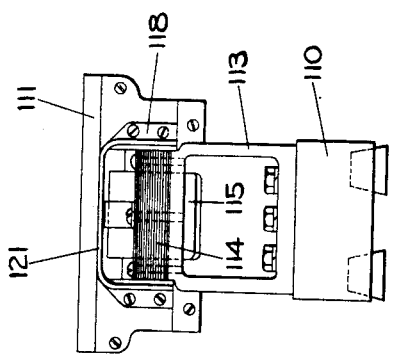
Fig. 13 is an end elevational view of the device of Figs. 11 and 12.

In Figs. 11, 12 and 13 I have illustrated another device comprising a different apparatus, but one which may be employed to carry out the method of my invention. It is to be understood that, unless a contrary condition is indicated, the above description of the device of Figs. 1, 2 and 3 also applies to this device. Said device includes a base 110, a deck or pan 111, and angularly disposed cantilevers 112. The deck 111 is deepened and widened at its receiving end thereby to prevent spillage and increase the capacity thereof.

The vibratory motor of this device is much more simple than that of the previously described device. Said motor comprises a bracket 113 mounted upon base 110 and carrying laminated field core 114 at its top. A field winding 115 is provided for energizing the field core 114. Cable 116 leads the terminals of field coil 115 to a plug 117 which may be inserted in a receptacle of standard construction. It is contemplated that a variable rheostat be inserted in series with the field coil 115 to control the amplitude of vibration of deck 111, as no variation is provided of the nature of that above described in connection with the device of Figs. 1, 2 and 3. It may also be mentioned that, if desired, the control of the device of Figs. 1, 2 and 3 may be supplemented by inserting a variable rheostat in series therewith.

At its rear face the deck 111 is formed by a trough closing plate 118 carrying an armature support 119 which is provided with a laminated armature 120 adapted to be attracted by core 114 when energized by an undulating or alternating current. The vibratory movement of the armature 120 will be transferred to the deck 111 which will operate in the manner above described in connection with the device of Figs. 1, 2 and 3. A hood 121 is also provided to cover the field winding 115 and to protect it from any material which may spill from deck 111.

In addition to those structural elements above described, it has been found desirable to add an adjustable bumper to the device if it is to be operated from 25 or 30 cycle current. It has been found that devices which operate at these frequencies have a characteristic in that the armature is attracted a large amount when starting and the laminations thereof actually contact the laminations of the field structure. It has also been found that at times there is a tendency for these laminations to stick together, after having so contacted. To prevent this sticking during starting, and also to insure against contacting thereof, while running, I supply the devices which are to operate from 25 and 30 cycle currents with an adjustable bumper now to be described.

As illustrated in Figs. 1, 2 and 3, said bumper comprises a stationary bracket 125 rigidly attached to base 21, as by machine screws 126. To said bracket 125 is attached a spring plate 127 having an upright portion and a horizontal portion 128 positioned below the bracket 125, and preferably welded thereto, as at 129. At its top the spring plate 127 carries an extended strip of resilient material 130, such as soft rubber, adapted to contact the heads of screws 32, when the deck or pan 30 is in a rearward position. A pair of adjusting screws 131, 131 thread through the upstanding web of bracket 125 and cooperate with plate 127 to provide appropriate adjustment thereof. Locking nuts 132, 132 are provided to lock adjusting screws 131, 131 in adjusted position. The spring plate 127 will be biased to contact with adjusting screws 131, 131. It is thus evident that by adjusting said screws 131, 131 the exact position of contact between the heads of screws 33 and the resilient material 130 may be determined and thus the separating force of said spring plate 127 may be adjusted.

An equivalent bumper mechanism is also shown in the device of Figs. 11 and 12. As here disclosed, a spring plate 135 is provided which is attached to the bottom of bracket 113 by machine screws 136. The top of said spring plate 135 carries a resilient strip 137 such as rubber, adapted to be contacted by the heads of screws 138 when the deck or pan 111 moves rearwardly. Appropriate adjusting screws 139, having lock nuts 140, are provided to thread through an upstanding flange of bracket 113 to adjust the spring plate 135.

Obviously those skilled in the art may make various changes in the details and arrangement of parts without departing from the spirit and scope of the invention as defined by the claims hereto appended, and I wish therefore not to be restricted to the precise construction herein disclosed.

Having thus described and shown an embodiment of my invention, what I desire to secure by Letters Patent of the United States is:

1. The method of transferring material from one position to another position horizontally removed therefrom, which comprises carrying said material on a supporting surface, periodically storing energy in an elastic deflectable member supporting said supporting surface at a frequency not less than 6000 cycles per minute, and periodically employing said stored energy to impart periodic movements to said supporting surface, said movements each having a horizontal and a vertical component.

2. The method of transferring material from one position to another position horizontally removed therefrom, which comprises supporting said material on a support having a natural period of vibration and comprising energy storing leaf springs, intermittently deflecting said leaf springs at a period slightly different from said natural period and at not less than 6000 cycles per minute to store energy therein, and employing said stored energy to impart intermittent movement to said support, said movement having a horizontal and a vertical component.

3. The method of transferring material from one position to another position horizontally removed therefrom, which comprises supporting said material on a support having a natural period of vibration and comprising energy storing leaf springs, intermittently deflecting said leaf springs at a period slightly different from said natural period and at not less than 7200 cycles per minute to store energy therein, and employing said stored energy to impart intermittent movement to said support, said movement having a horizontal and a vertical component, the horizontal component being greater than the vertical component.

4. The method of transferring material from one position to another position horizontally removed therefrom, which comprises supporting said material on a supporting surface supported by energy storing cantilevers inclined to the plane of said supporting surface, periodically deflecting said cantilevers to store energy therein at a frequency of 7200 cycles per minute and periodically dissipating said stored energy by imparting periodic movement to said supporting surface, said movement having a horizontal and a vertical component relative to said supporting surface.

5. In a vibrating conveyor, the combination with a material support carried on cantilever supporting means adapted to store energy, the cantilever supporting means making a relatively large acute angle with the material support, of a base plate to which said cantilever supporting means is connected, said base plate being heavier than said material support, said material support and cantilever supporting means comprising a vibratory system with a predetermined natural period of vibration, and means comprising an electric vibrator including a shiftable field structure and a pair of armatures providing a magnetic path of substantially constant reluctance for a plurality of positions of said field structure relative to said armatures, one of said armatures being connected to said material support, said vibrator being adapted to store energy in said cantilever supporting means periodically to vibrate said material support at approximately the natural frequency of said body and at an amplitude determined by the position of said field structure relative to said two armatures, said vibratory motion having both a horizontal and a vertical component relative to the plane of said material support.

6. In a vibratory conveyor, the combination with a material support carried on spring leaves, of a base to which said spring leaves are mounted, said spring leaves making an acute angle with said support, and means comprising a vibratory electric motor adapted to be energized from a source of commercial alternating current of not less than 50 cycles per second and to vibrate said support at a frequency of not less than 6000 cycles per minute.

7. In a vibratory conveyor, the combination with a material supporting deck, of a base, flexible spring means for supporting said deck from said base, said spring means comprising flat leaves which make an acute angle of approximately 70 degrees with the plane of said deck, said deck and supporting means comprising a vibratory structure having a natural period of vibration, and means for vibrating said structure at a frequency near to, but not exactly equal to, said natural period and not less than 6000 cycles per minute.

8. In a vibratory conveyor, the combination with a material supporting deck, of a base, flexible spring means for supporting said deck from said base, said spring means comprising flat leaves which make an acute angle with the plane of said deck, said deck and supporting means comprising a vibratory structure having a natural period of vibration, and means for vibrating said structure at a frequency near to, but not exactly equal to, said natural period and not less than 6000 cycles per minute.

9. The method of transferring material from one position to another position horizontally removed therefrom, which comprises supporting said material on a deck which has a natural period of vibration, and imparting vibratory movement to said deck at a rate not less than 6000 cycles per minute and at a frequency near to, but not equal to, said natural period, said movement having a horizontal and a vertical component relative to said supporting surface.

10. The method of transferring material from one position to another position horizontally removed therefrom, which comprises supporting said material on a deck and imparting vibratory movement to said deck at a rate not less than 6000 cycles per minute, said movement having a horizontal and a vertical component relative to said supporting surface.

11. In a vibratory conveyor, the combination with a flat impervious deck, of a base, energy storing and supporting means including a cantilever extending between and connected to said base and said deck and adapted to support said deck from said base, said means including said cantilever comprising a flat plate extending beneath said deck substantially from one side thereof to the other and making an acute angle with the plane of said deck, said deck being thus mounted for free and unobstructed vibratory movement, said means including said cantilever having sufficient strength and restoring force with respect to the deck weight so as not to deflect appreciably due to a full load on said deck and operative to vibrate said deck at a frequency of not less than 3000 cycles per minute, and a non-rotary vibratory motor of the continuous circuit or non-make-and-break type adapted to be energized from undulating current and to deflect and release said means including said cantilever at a frequency of not less than 3000 cycles per minute.

12. In a vibratory conveyor, the combination with a flat impervious open trough deck, of a base, a plurality of energy storing and supporting spring means extending between and connected to said base and said deck and adapted to support said deck from said base, said spring means each comprising a flat plate extending beneath said deck substantially from one side thereof to the other and making an acute angle with the plane of said deck, the vibrating portions of said spring means being connected to said deck and being connected together by virtue of their connection to said deck, said deck being thus mounted for free and unobstructed vibratory movement, said spring means having sufficient strength and restoring force with respect to the deck weight so as not to deflect appreciably due to a full load on said deck and to vibrate said deck at a frequency of not less than 3000 cycles per minute, and a non-rotary vibratory motor of the continuous circuit or non-make-and-break type adapted to be energized from undulating current and to deflect and release said spring means at a frequency of not less than 3000 cycles per minute.

13. In a vibratory conveyor, the combination with a flat impervious deck, of a base, energy storing and supporting means including a cantilever extending between and connected to said base and said deck and adapted to support said deck from said base, said means including said cantilever comprising a flat plate extending beneath said deck substantially from one side thereof to the other and making an acute angle with the plane of said deck, said deck being thus mounted for free and unobstructed vibratory movement, said means including said cantilever having sufficient strength and restoring force with respect to the deck weight so as not to deflect appreciably due to a full load on said deck and to vibrate said deck at a frequency of not less than 6000 cycles per minute, and a non-rotary vibratory motor of the continuous circuit or non-make-and-break type adapted to be energized from undulating current and to deflect and release said means including said cantilever at a frequency of not less than 6000 cycles per minute.

14. In a vibratory conveyor, the combination with a flat impervious deck, of a base, energy storing and supporting spring means extending between said base and said deck and adapted to support said deck from said base, said spring means comprising flat plates extending beneath said deck substantially from one side thereof to the other and making acute angles with the plane of said deck, said deck being thus mounted for free and unobstructed vibratory movement, said spring means having sufficient strength and restoring force with respect to the deck weight so as to provide a vibratory system having a natural period of vibration, and a non-rotary vibratory motor of the continuous circuit or non-make-and-break type adapted to be energized from undulating current and to deflect and release said spring means to vibrate said deck at a period not equal to said natural period of vibration and at a frequency of not less than 6000 cycles per minute.

JAMES A. FLINT.